(12) United States Patent
Mayya et al.

(10) Patent No.: US 11,444,872 B2
(45) Date of Patent: Sep. 13, 2022

(54) METHOD AND SYSTEM OF APPLICATION-AWARE ROUTING WITH CROWDSOURCING

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Sunil Mukundan, Chennai (IN); Thomas Harold Speeter, San Martin, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 16/699,719

(22) Filed: Dec. 1, 2019

(65) Prior Publication Data

US 2020/0106706 A1 Apr. 2, 2020

Related U.S. Application Data

(63) Continuation of application No. 15/407,767, filed on Jan. 17, 2017, now Pat. No. 10,498,652, which is a (Continued)

(51) Int. Cl.
*H04L 12/741* (2013.01)
*H04L 12/66* (2006.01)
(Continued)

(52) U.S. Cl.
CPC ........ *H04L 45/745* (2013.01); *H04L 12/4633* (2013.01); *H04L 12/66* (2013.01);
(Continued)

(58) Field of Classification Search
CPC ....... H04L 12/741; H04L 12/66; H04L 12/46; H04L 12/717; H04L 29/06; H04L 12/931; H04L 12/725; H04L 12/26
See application file for complete search history.

(56) References Cited

U.S. PATENT DOCUMENTS 5,652,751 A 7/1997 Sharony
5,909,553 A 6/1999 Campbell et al.
(Continued)

FOREIGN PATENT DOCUMENTS

CN 1926809 A 3/2007
CN 102577270 A 7/2012
(Continued)

OTHER PUBLICATIONS

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.
(Continued)

*Primary Examiner* — Kevin C. Harper
*Assistant Examiner* — Henry Baron
(74) *Attorney, Agent, or Firm* — Adeli LLP

(57) ABSTRACT

In one aspect, a computerized method of an application routing service includes the step of using a deep-packet inspection (DPI) technique on a first network flow to identify an application. The method includes the step of storing an Internet-protocol (IP) address and a port number used by the application and an identity of the application in a database. The method includes the step of detecting a second network flow. The method includes the step of identifying the IP address and the port number of the application in the second network flow. The method includes the step of looking up the IP address and the port number in the database. The method includes the step of identifying the application based on the IP address and the port number.

22 Claims, 10 Drawing Sheets

Related U.S. Application Data continuation-in-part of application No. 15/097,282, filed on Apr. 12, 2016, now Pat. No. 10,135,789.

(60) Provisional application No. 62/146,786, filed on Apr. 13, 2015.

(51) Int. Cl.

| | | |
|---|---|---|
| *H04L 12/46* | (2006.01) | |
| *H04L 12/717* | (2013.01) | |
| *H04L 29/06* | (2006.01) | |
| *H04L 12/931* | (2013.01) | |
| *H04L 12/725* | (2013.01) | |
| *H04L 12/26* | (2006.01) | |
| *H04L 45/745* | (2022.01) | |
| *H04L 43/028* | (2022.01) | |
| *H04L 45/42* | (2022.01) | |
| *H04L 9/40* | (2022.01) | |
| *H04L 49/35* | (2022.01) | |
| *H04L 45/302* | (2022.01) | |
| *H04L 67/10* | (2022.01) | |
| *G06N 20/00* | (2019.01) | |

(52) U.S. Cl.
CPC ......... *H04L 43/028* (2013.01); *H04L 45/306* (2013.01); *H04L 45/42* (2013.01); *H04L 49/35* (2013.01); *H04L 63/029* (2013.01); *H04L 63/0272* (2013.01); *H04L 63/0281* (2013.01); *G06N 20/00* (2019.01); *H04L 67/10* (2013.01)

(56) References Cited

U.S. PATENT DOCUMENTS

| | | |
|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 * | 5/2008 | Guichard ............... H04L 47/10 726/15 |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,566,452 B1 | 10/2013 | Goodwin et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,559,951 B1 * | 1/2017 | Sajassi ................... H04L 45/66 |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 10,038,601 B1 | 7/2018 | Becker et al. |
| 10,057,183 B2 | 8/2018 | Salle et al. |
| 10,057,294 B2 | 8/2018 | Xu |
| 10,135,789 B2 | 11/2018 | Mayya et al. |
| 10,142,226 B1 | 11/2018 | Wu et al. |
| 10,178,032 B1 | 1/2019 | Freitas |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchai et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |

(56) References Cited

U.S. PATENT DOCUMENTS

| | | |
|---|---|---|
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,528 B2 | 2/2020 | Mayya et al. |
| 10,594,516 B2 | 3/2020 | Cidon et al. |
| 10,594,659 B2 | 3/2020 | El-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,686,625 B2 | 6/2020 | Cidon et al. |
| 10,693,739 B1 | 6/2020 | Naseri et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Gidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 2002/0085488 A1 | 7/2002 | Kobayashi |
| 2002/0087716 A1 | 7/2002 | Mustafa |
| 2002/0198840 A1 | 12/2002 | Banka et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0247204 A1 | 10/2009 | Sennett et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |

(56) References Cited

U.S. PATENT DOCUMENTS

| | | |
|---|---|---|
| 2012/0221955 A1 | 8/2012 | Raleigh et al. |
| 2012/0227093 A1 | 9/2012 | Shalzkamer et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0103834 A1 | 4/2013 | Dzerve et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1* | 12/2015 | Herle .............. H04L 63/0272 726/15 |
| 2015/0381407 A1 | 12/2015 | Wang et al. |
| 2015/0381493 A1 | 12/2015 | Bansal et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |

(56) References Cited

U.S. PATENT DOCUMENTS

| | | |
|---|---|---|
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1* | 9/2016 | Gu .................... H04L 12/4641 |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |

(56) References Cited

U.S. PATENT DOCUMENTS

| | | |
|---|---|---|
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1 | 8/2019 | Markuze et al. |
| 2019/0268973 A1 | 8/2019 | Bull et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0334813 A1 | 10/2019 | Raj et al. |
| 2019/0334820 A1 | 10/2019 | Zhao |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0059420 A1 | 2/2020 | Abraham |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0105199 A1 | 4/2021 | H et al. |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |

(56) References Cited

U.S. PATENT DOCUMENTS

| | | |
|---|---|---|
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2022/0006726 A1 | 1/2022 | Michael et al. |
| 2022/0006751 A1 | 1/2022 | Ramaswamy et al. |
| 2022/0006756 A1 | 1/2022 | Ramaswamy et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0094644 A1 | 3/2022 | Cidon et al. |

FOREIGN PATENT DOCUMENTS

| | | |
|---|---|---|
| CN | 102811165 A | 12/2012 |
| CN | 104956329 A | 9/2015 |
| CN | 106656847 A | 5/2017 |
| CN | 110447209 A | 11/2019 |
| CN | 111198764 A | 5/2020 |
| EP | 1912381 A1 | 4/2008 |
| EP | 3041178 A1 | 7/2016 |
| EP | 3509256 A1 | 7/2019 |
| JP | 2010233126 A | 10/2010 |
| JP | 2017059991 A | 3/2017 |
| RU | 2574350 C2 | 2/2016 |
| WO | 03073701 | 9/2003 |
| WO | 2007016834 A1 | 2/2007 |
| WO | 2012167184 A2 | 12/2012 |
| WO | 2016061546 A1 | 4/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091777 A1 | 5/2020 |
| WO | 2020101922 A1 | 5/2020 |
| WO | 2020112345 A1 | 6/2020 |
| WO | 2021040934 A1 | 3/2021 |
| WO | 2021118717 A1 | 6/2021 |
| WO | 2021150465 A1 | 7/2021 |
| WO | 2021211906 A1 | 10/2021 |
| WO | 2022005607 A1 | 1/2022 |

OTHER PUBLICATIONS

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-published Commonly Owned U.S. Appl. No. 16/576,751, filed Sep. 19, 2019, 42 pages, Nicira, Inc.

Non-published Commonly Owned U.S. Appl. No. 16/656,555, filed Oct. 17, 2019, 40 pages, Nicira, Inc.

Petition for Post-Grant Review of U.S. Pat. No. 9,722,815, filed May 1, 2018, 106 pages.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MAS-COTS), Sep. 19-21, 2016, 10 pages, IEEE, London, UK.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Non-Published Commonly Owned U.S. Appl. No. 16/945,700, filed Jul. 31, 2020, 37 pages, Nicira, Inc.

Non-Published Commonly Owned U.S. Appl. No. 17/068,603, filed Oct. 12, 2020, 37 pages, Nicira, Inc.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Sarhan, Soliman Abd Elmonsef, et al., "Data Inspection in SDN Network," 2018 13th International Conference an Computer Engineering and Systems (ICCES), Dec. 18-19, 2018, 6 pages, IEEE, Cairo, Egypt.

Xie, Junfeng, et al., A Survey of Machine Learning Techniques Applied to Software Defined Networking (SDN) Research Issues and Challenges, IEEE Communications Surveys & Tutorials, Aug. 23, 2018, 38 pages, vol. 21, Issue 1, IEEE.

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

Lasserre, Marc, et al., "Framework for Data Center (DC) Network Virtualization," RFC 7365, Oct. 2014, 26 pages, IETF.

Lin, Weidong, et al., "Using Path Label Routing in Wide Area Software-Defined Networks with Open Flow," 2016 International Conference on Networking and Network Applications, Jul. 2016, 6 pages, IEEE.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

(56) References Cited

OTHER PUBLICATIONS

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.
Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.
Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.
Non-Published Commonly Owned U.S. Appl. No. 17/562,890, filed Dec. 27, 2021, 36 pages, Nicira, Inc.
Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IFFF, Toronto, ON, Canada.
Guo, Xiangyi, et al., (U.S. Appl. No. 62/925,193), filed Oct. 23, 2019, 26 pages.

\* cited by examiner

METHOD AND SYSTEM OF APPLICATION-AWARE ROUTING WITH CROWDSOURCING

CROSS REFERENCE TO RELATED CLAIM OF BENEFIT TO PRIOR APPLICATIONS

This application is a continuation of U.S. patent application Ser. No. 15/407,767, filed Jan. 17, 2017, now published as U.S. Patent Publication 2017/0126564. U.S. patent application Ser. No. 15/407,767 claims priority and is a continuation-in-part of U.S. patent application Ser. No. 15/097,282, filed on Apr. 12, 2016, now issued as U.S. Pat. No. 10,135,789. U.S. patent application Ser. No. 15/097,282 claims priority from U.S. Provisional Patent Application No. 62/146,786, filed Apr. 13, 2015. U.S. patent application Ser. No. 15/407,767 is hereby incorporated by reference in its entirety.

FIELD OF THE INVENTION

This application relates generally to computer networking, and more specifically to a system, article of manufacture and method of establishing a cloud-based multipath routing protocol.

DESCRIPTION OF THE RELATED ART

Deep-packet inspection (DPI) can be used to identify an application is inside a data flow. For example, a voice-call service (e.g. Skype®, etc.) application can be executed. Various routing decisions can be implemented based on the identity of the application. However, a DPI engine may not be able to identify the voice-call service application from the first packet. For example, this can be a TCP send to set up a connection. If a networking system wishes to make a routing decision (e.g. use a specific wide-area network (WAN) link for a Skype® call, etc.), it may not be able to do so on the first packet. The decision must wait until after the until the voice-call service protocol starts passing back and forth and the DPI engine identifies the voice-call service application signature. Accordingly, improvements to application-aware routing are desired.

BRIEF SUMMARY OF THE INVENTION

In one aspect, a computerized method of an application routing service includes the step of using a deep-packet inspection (DPI) technique on a first network flow to identify an application. The method includes the step of storing an Internet-protocol (IP) address and a port number used by the application and an identity of the application in a database. The method includes the step of detecting a second network flow. The method includes the step of identifying the IP address and the port number of the application in the second network flow. The method includes the step of looking up the IP address and the port number in the database. The method includes the step of identifying the application based on the IP address and the port number.

In another aspect, A computerized method useful for implementing an application routing service includes the step of extracting from a data packet of a network flow a layer three (3) information and a layer four (4) information. The method includes the step of querying a local application routing cache to obtain an application name based on the layer three (3) information and the layer four (4) information. The method includes the step of providing a routing decision based on the application name.

In yet another aspect, a computerized method useful for implementing an application routing service includes, with an edge device, using deep-packet inspection (DPI) to identify a network flow, wherein the network flow is identified with an internet protocol (IP) identity and a port number of the network flow. The edge device stores the IP identity and the port number of the network flow in a local application routing database. The edge device reports the IP identity and the port number to a specified Orchestrator. Another edge device requests the IP identity and the port number from the specified Orchestrator. The other edge device receives the IP identity and the port number from the specified Orchestrator. The other edge device identifies an application in another network flow using the IP identity and the port number.

Figure 1:
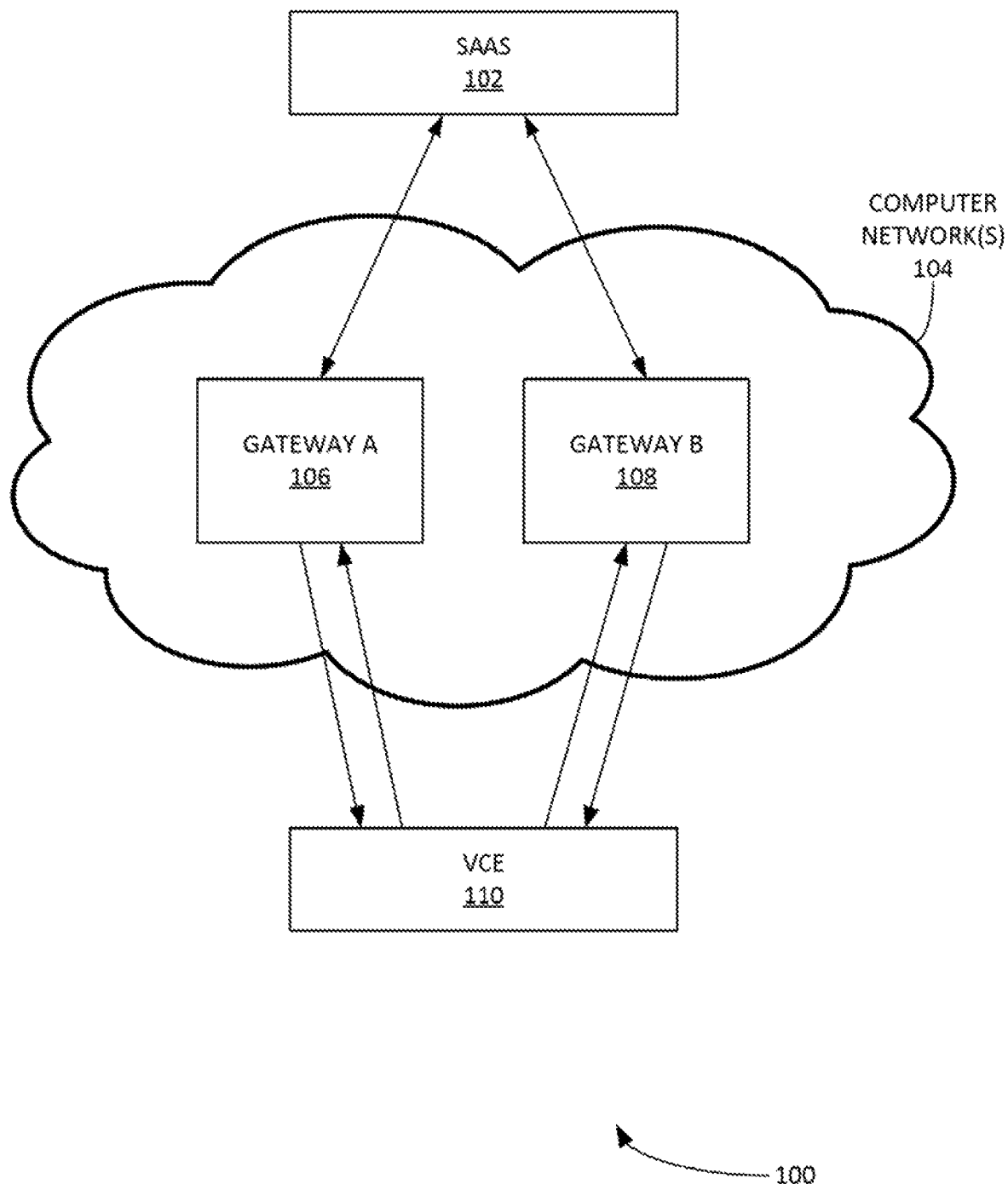
FIG. 1 illustrates an example self-healing network with redundant gateways, according to some embodiments.

The Figures described above are a representative set, and are not exhaustive with respect to embodying the invention.

DESCRIPTION

Disclosed are a system, method, and article of manufacture for application-aware routing with crowdsourcing. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Cloud computing can involve deploying groups of remote servers and/or software networks that allow centralized data storage and online access to computer services or resources. These groups of remote servers and/or software networks can be a collection of remote computing services.

Cloud Edge (CE) can include a cloud multipath to an Internet endpoint.

Customer-premises equipment (CPE) can be any terminal and associated equipment located at a subscriber's premises and connected with a carrier's telecommunication channel at the demarcation point.

Edge device can be a device that provides an entry point into enterprise or service provider core networks. An edge device can be software running in a virtual machine (VM) located in a branch office and/or customer premises.

Flow can be a grouping of packets that match a five (5) tuple which is a combination of Source IP Address (SIP), Destination IP Address (DIP), L4 Source Port (SPORT) and L4 Destination Port (DPORT) and the L4 protocol (PROTO).

Forward error correction (FEC) (e.g. channel coding) can be a technique used for controlling errors in data transmission over unreliable or noisy communication channels.

Deep learning can be a type of machine learning based on a set of algorithms that attempt to model high-level abstractions in data by using model architectures, with complex structures or otherwise, composed of multiple non-linear transformations Deep Packet Inspection (DPI) can be the ability to analyze the different layers of a packet on the network.

Gateway can be a node (e.g. a router) on a computer network that serves as an access point to another network.

Internet Protocol Security (IPsec) can be a protocol suite for securing Internet Protocol (IP) communications by authenticating and encrypting each IP packet of a communication session.

Multipath routing can be a routing technique of using multiple alternative paths through a network.

Multilink bundle can be a collection of simultaneously opened bandwidth channels that are coherently and logically controlled by preset commands.

Multiprotocol Label Switching (MPLS) can be a mechanism in telecommunications networks that directs data from one network node to the next based on short path labels rather than long network addresses, thus avoiding complex lookups in a routing table.

Orchestrator can include a software component that provides multi-tenant and role based centralized configuration management and visibility.

Quality of Service (QoS) can include the ability to define a guaranteed set of actions such as routing, resource constraints (e.g. bandwidth, latency etc.).

Session can be a semi-permanent interactive information interchange between two or more communicating devices.

Software as a service (SaaS) can be a software licensing and delivery model in which software is licensed on a subscription basis and is centrally hosted.

Tunneling protocol can allow a network user to access or provide a network service that the underlying network does not support or provide directly.

Virtual Desktop Infrastructure (VDI) is a desktop-oriented service that hosts user desktop environments on remote servers and/or blade PCs. Users access the desktops over a network using a remote display protocol.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Voice over IP (VoIP) can a methodology and group of technologies for the delivery of voice communications and multimedia sessions over Internet Protocol (IP) networks, such as the Internet.

Additional example definitions are provided herein.

Scalable, Self-Healing Network Cloud Service for Branch Networking

FIG. 1 illustrates an example self-healing network 100 with redundant gateways, according to some embodiments. In network 100, data traffic can be routed to different gateways for different purposes. Multiple gateways can serve the same destination utilizing dynamic routing protocol. As services (e.g. SaaS 102) in the Internet (e.g. computer networks 104) may not centrally located. The combination of the Internet's wide distribution of services and/or changes in the transport quality across can lead to the use of different egress points to access different destinations. This is accomplished by deploying multiple gateways (e.g. gateways A-B 106-108) in stand-alone or redundant configurations.

An Orchestrator can inform each edge device (e.g. VCE 110) of a list of gateways it has been assigned. Additionally, routes and/or services can be assigned a subset of the gateway list that can be used for communication with a specific destination. The edge device can then perform a static determination by metrics assigned to each gateway.

For example, each gateway can be assigned a metric based on geographic distance from the edge and/or a dynamic determination based on empirically measured loss, latency and/or jitter to the gateway across the Internet.

In the redundant configuration of FIG. 1, gateways A-B 106-108 can support dynamic routing protocols on the non-edge device side. This can ensure that the gateway chosen for traffic destined from the edge to the gateway is also advertised from the gateway upstream as the route with the lowest cost for return traffic. Various attributes of gateways are now discussed.

Figure 2:
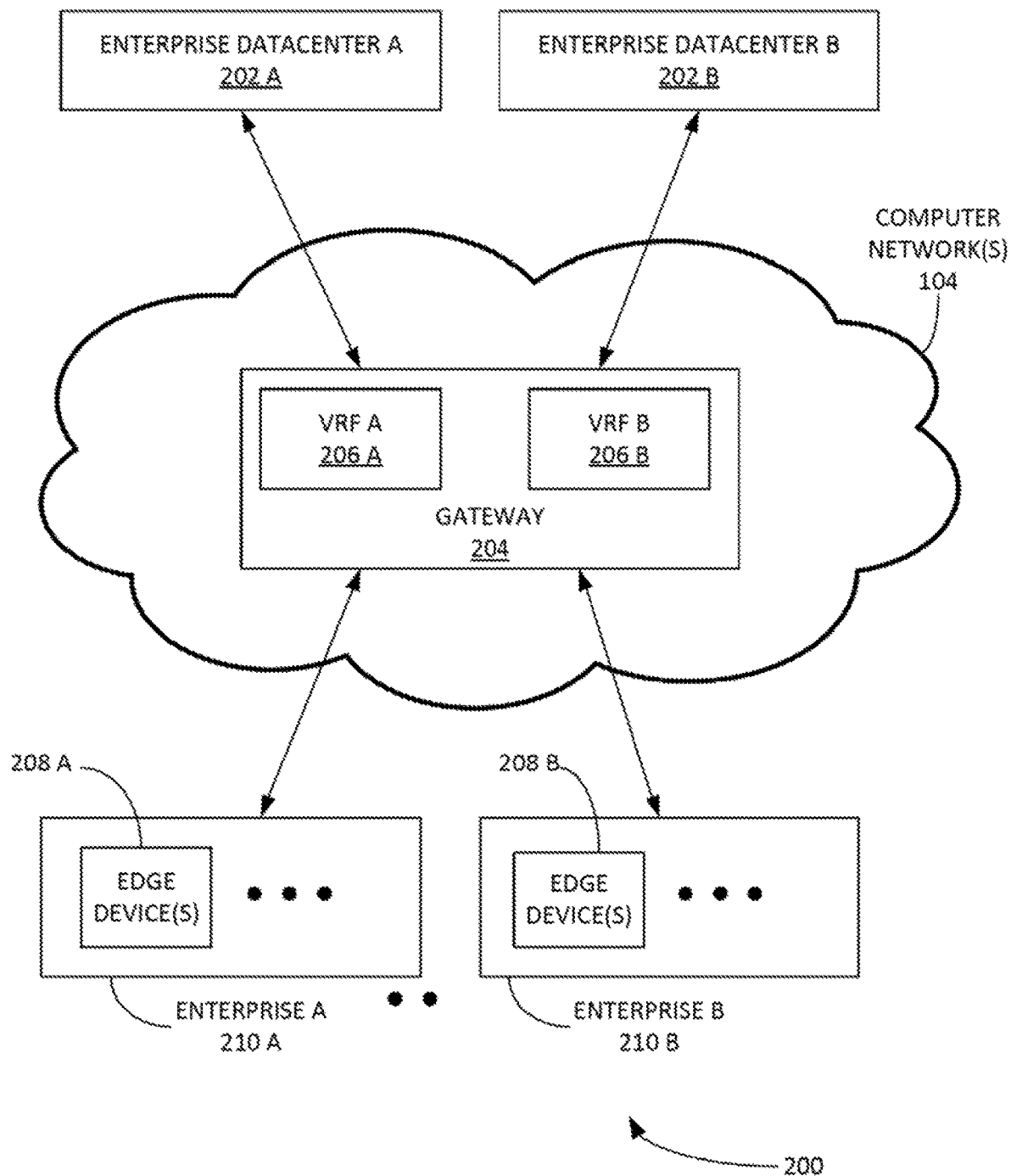
FIG. 2 illustrates an example system that includes autonomous gateways, according to some embodiments

FIG. 2 illustrates an example system 200 that includes autonomous gateways, according to some embodiments. Gateway High Availability (HA) and horizontal scalability can be inherent as configuration is edge-driven and not configured on gateway 204. Edge tunnel initialization can configure, gateway 204. Edge devices 208 A-B can communicate QoS information to gateway 204 so they have information on how to treat network traffic. Implementing versioning in the flow header can ensures that gateway 204 have the correct QoS information. This is accomplished by creating flows with a version number of one (1) on the edge and incrementing this version every time a policy change is enacted on the edge. If the gateway receives a message with a higher than expected version number in the header, it will request the edge to send the updated policy information.

It is noted that each individual gateway is a self-contained autonomous entity. This is accomplished by driving configuration of gateway 204 through the edge devices 208 A-B rather than gateway 204 being directly configured by the Orchestrator. In the initial negotiation, edge devices 208 A-B can send an MP_INIT message (e.g. an initial MP tunnel establishment handshake message exchange between the edge device and the gateway device) which contains all the information needed to identify the edge device and serve as a secure and unsecure gateway for edge device traffic. This can include a logical identifier for the enterprise which is used for virtual routing and/or forwarding. The logical Identifier can also be used for subnets that are routable behind edge devices 208 A-B.

If edge devices 208 A-B is the first edge device belonging to the enterprise to connect to gateway 204, a new virtual routing and forwarding (VRF) table can be created for the enterprise. Edge devices 208 A-B's subnets can be inserted into the enterprise VRF. If edge devices 208 A-B are not the first from an enterprise to connect, the enterprise logical identifier can be used to index into the existing VRF and edge devices 208 A-B's subnets can be added to the existing table.

In another example, when a new flow is created on an edge device, the parameters used to perform QoS and/or routing on the flow can be transmitted along with the first packet to any of the gateway 204 that are handling the flow. In this manner gateway 204 can be inherently highly available. If the gateway service is removed and replaced with a new gateway service instance, edge devices 208 A-B can send a new MP_INIT which can recreate the VRF and then continue sending data traffic uninterrupted through the gateway.

By this same token, gateway 204 can be highly available because the edge can switch between gateways without interrupting customer traffic. For example, when an Orchestrator inserts an additional gateway in a gateway list that can be assigned an edge device. The edge device can then connect and begin using the gateway seamlessly without any requirement for Orchestrator to gateway communication. This removes the need for the Orchestrator to synchronize configuration changes on the edge device and the gateway as the edge device is used as the intermediary.

In another example, a gateway need not be a single gateway instance but the Internet Protocol (IP) address may be the external facing IP address of a gateway load balancer. The gateway load balancer can start and stop individual gateway instances. If the gateway load balancers detect that an instance is near its CPU and/or throughput capacity, it can shift traffic to an alternate gateway transparently and/or create a new gateway and begin steering connections to it. When gateway reboots, upgrades or maintenance are required, the gateway load balancer can steer traffic away from those instances that require maintenance to make these operations transparent to the end user.

Figure 3:
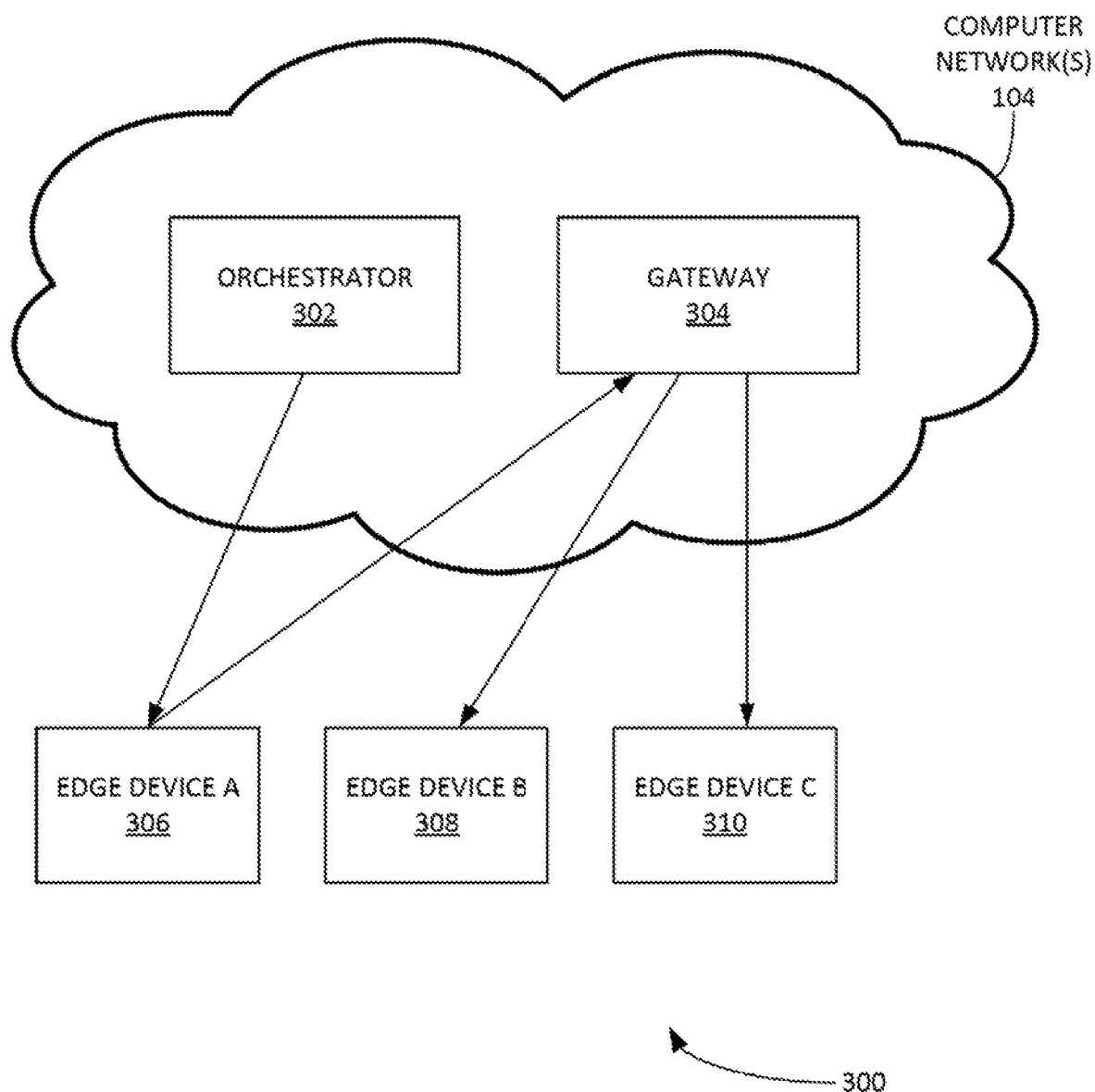
FIG. 3 illustrates an example of a system of an instant VPN, according to some embodiments.

FIG. 3 illustrates an example of a system 300 of an instant VPN, according to some embodiments. The edge device (e.g. edge devices 306-310) and gateway 304 can automatically negotiate IPsec tunnels alongside their unsecure Velocloud Multipath Protocol (VCMP) tunnels in preparation for the transmission of secure traffic. This can be performed irrespective of whether or not a VPN has been enabled on the device. In this manner, the network can be prepared to transmit secure traffic at any time. Leveraging this, an "Instant VPN" can be delivered by toggling VPN on or off on Orchestrator 302. Each edge device has a list of local subnets that are sent to gateway 304 during MP_INIT. Each subnet is can include an indication of whether or not it is reachable over VPN. When VPN is enabled on Orchestrator 302, each edge device can be informed that its subnets are reachable over VPN and each edge device can update its gateways with this information. When VPN is disabled on Orchestrator 302, each edge device can be informed that its subnets are not reachable over VPN. The edge device can update gateway 304 accordingly.

Between each edge device and its associated gateways can be a routing protocol. The routing protocol can relay state information to peers that are one hop away. For example, edge device A 306 can have a subnet A. Edge device B 308 can have subnet B. When the user enables VPN on Orchestrator 302, edge device A 306 and edge device B 308 can inform the gateways that their local subnets A and B are reachable over VPN. The gateway(s) can then inform peers in the enterprise VRF. In this way, a message can be sent to edge device B 308 instructing it that subnet A is now reachable through it. A message can also be sent to edge device A 306 instructing it that subnet B is now reachable through it. When an edge device loses connectivity to a gateway, gateway 304 can relay to peers in the VRF that the subnet is no longer reachable and the edge device updates the routing/forwarding table to mark all routes via that unreachable gateway. In this way, gateways can be added or removed, and/or routes added and removed, without restarts and/or loss of connectivity assuming at least one gateway is connected at all times.

In some examples, "Always on" IPsec tunnels can be provided. Enable/disable VPN operations can include the insertion and/or removal of routes for the appropriate VPN zone. VRF can include enterprise logical identifier on gateway ensuring multi-tenancy.

Figure 4:
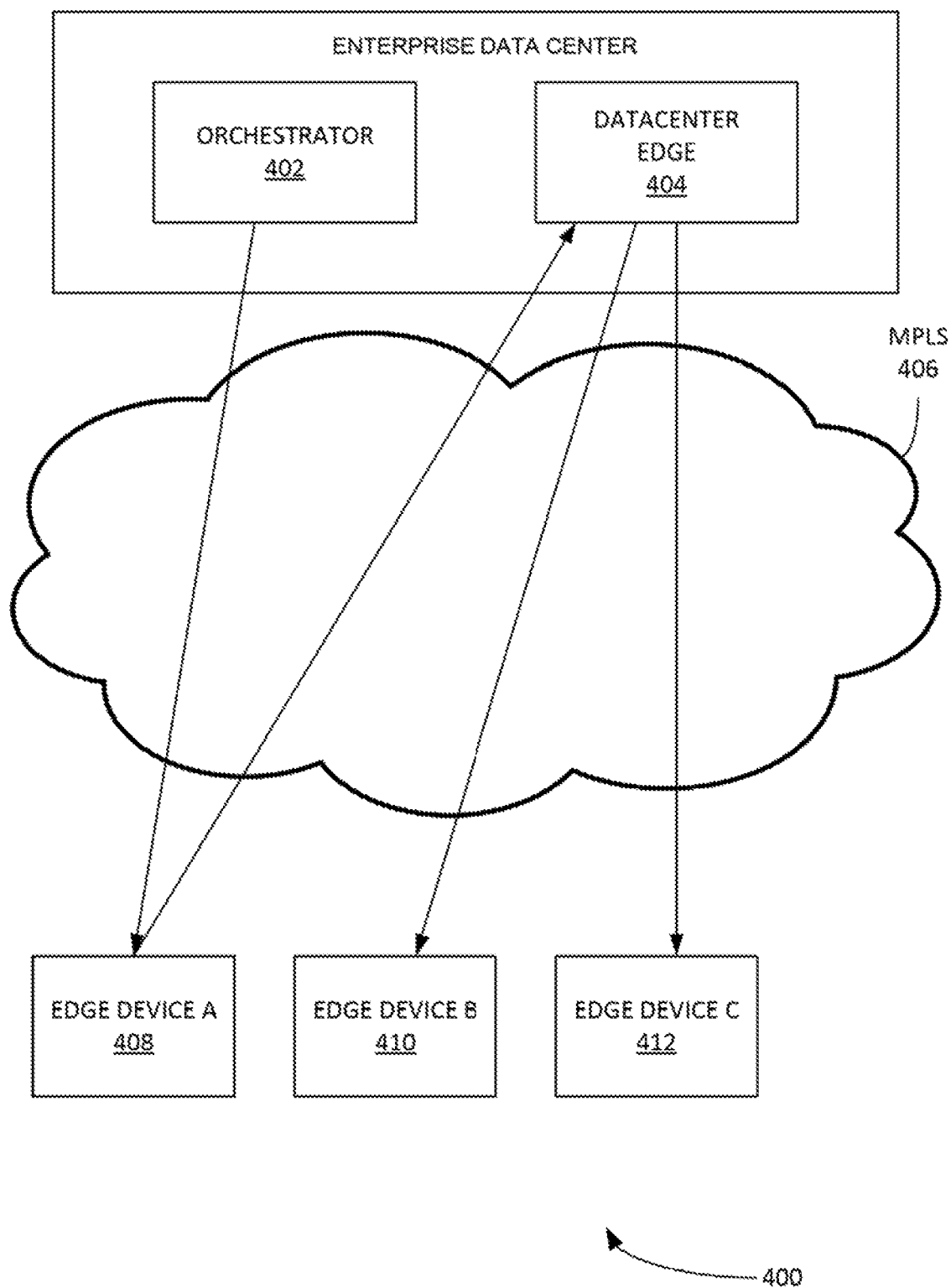
FIG. 4 illustrates another example of a system of an instant VPN, according to some embodiments.

FIG. 4 illustrates another example of a system 400 of an instant VPN, according to some embodiments. A special edge device called a Datacenter Edge (DCE) 404 can be deployed as customer premise equipment. DCE 404 can be deployed in an enterprise data center, along with Orchestrator 402. DCE 404 can subsume some of the functionality of the gateway, including this route protocol management. A typical use case for this deployment can be in a pure MPLS network 406 in which there are no public Internet links and thus no public Internet gateways. In one example, route propagation can occur the same as described supra except that the VRF and routing protocol messages are managed by DCE 404. MPLS network 406 can connect with edge devices 408-412.

Figure 5A:
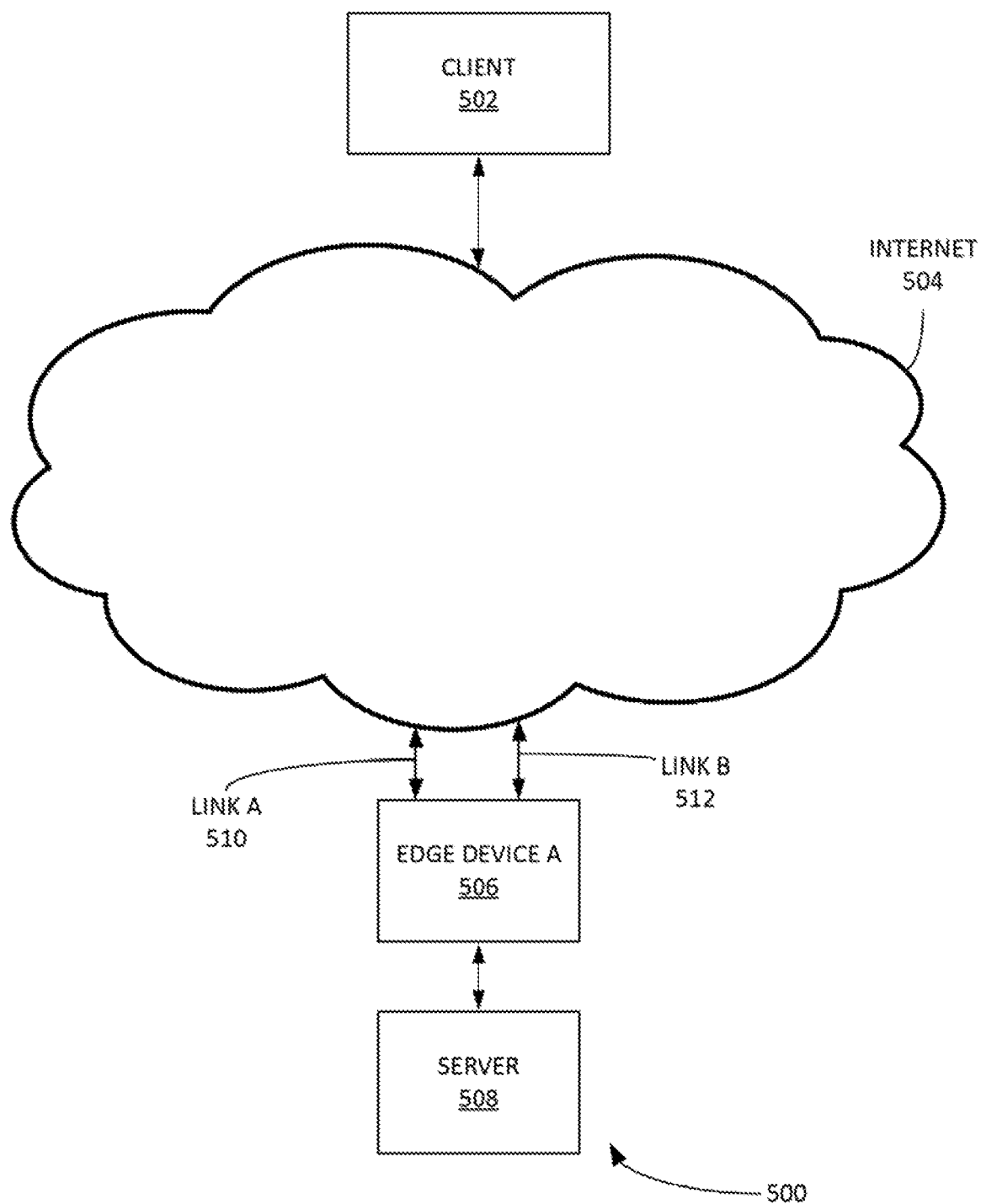
FIGS. 5 A-B illustrates an example of a system of a cloud multipath to an Internet endpoint, according to some embodiments.
Figure 5B:
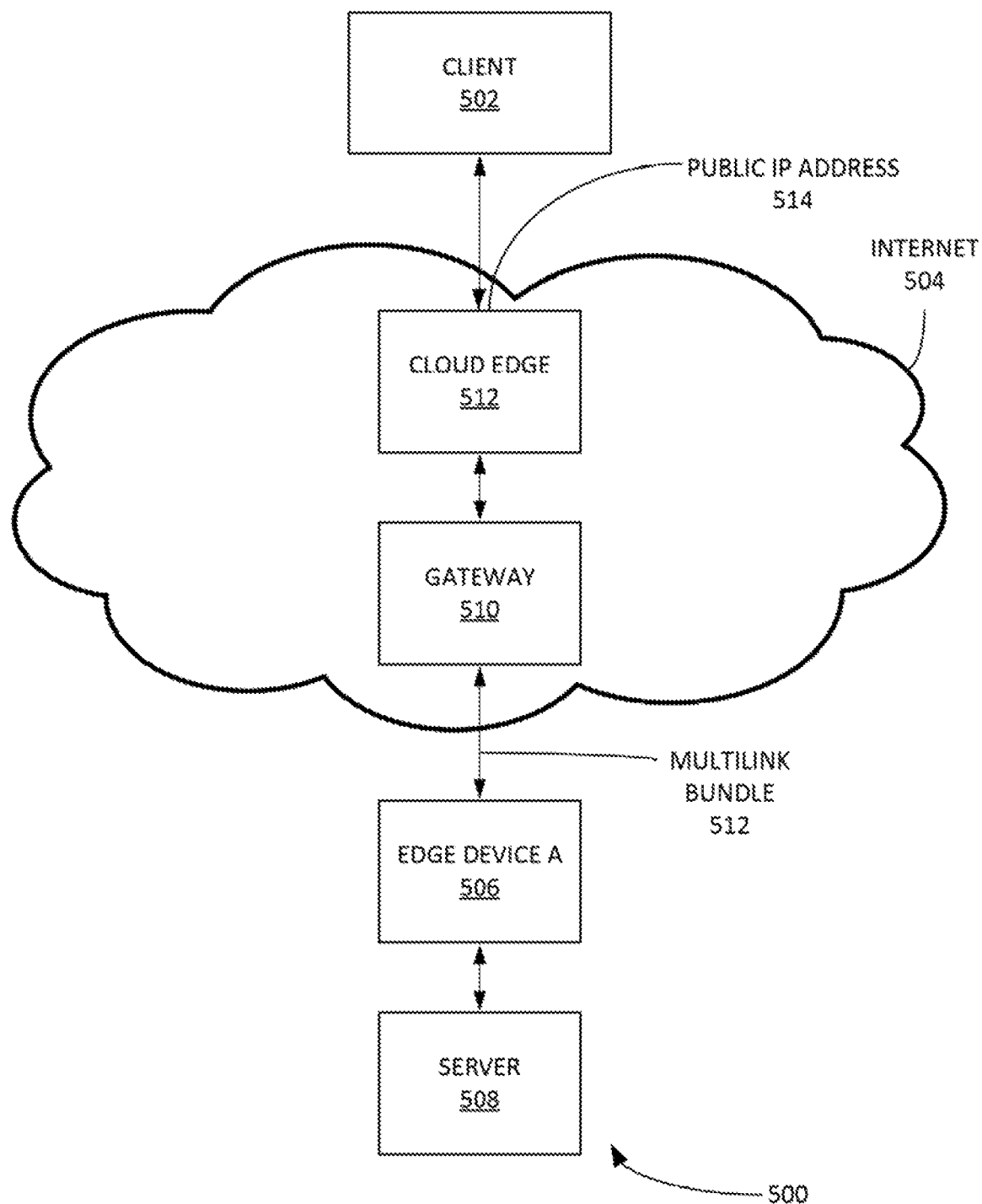

FIGS. 5 A-B illustrate an example of system 500 of a cloud-based multipath routing technique to an Internet endpoint (e.g. a cloud edge 516), according to some embodiments. Edge device 506 and gateway 518 can implement a multipath solution to deliver a reliable connection across the public Internet for outbound connections (e.g. between server 508 and client 502) initiated from the edge (e.g. edge device 506) through gateway 518, as well as for their return traffic. This can include multilink bundle(s). An alternate use case can include when the network traffic is initiated from an outside source. For example, the network traffic can be initiated from the Internet to server 508 in a branch office behind edge device 506.

In an example deployment, this can be Implemented by enabling a set of inbound firewall rules that allow network traffic in one or more of the wide area network (WAN) links attached to the edge device. Such an inbound connection can use a single link. For example, a session established on link A 510 may fail if link A 510 fails, and similarly for link B 512. Therefore, there is a desire to be able to support inbound connections reliably without compromising the security of the deployment.

This can be achieved by cloud edge (CE) device 516. CE 516 can be implemented in a cloud-computing environment. CE 516 can join the same VRF as that of edge device 506.

Edge device 506 can be used to accesses various resources (e.g. server 508) to be reliably accessed. In one example, edge device 506 can be set to deny inbound traffic by default. Edge device 506 can allow an administrator to specify various sources and destinations of traffic that are permitted (e.g. client 502).

For example, a rule could be created that enable the public IP address of a client 502 to reach server 508 via a public IP address 514. Public IP address 514 can be assigned to the "LAN" side of CE 516. The administrator can then connect to public IP address 514 in the cloud rather than the IP address of one of the links at the site directly. Client 502 can then securely connect over a VPN to server 508 inside the network. CE 516 can be located anywhere in the (e.g. public) Internet 504. In one example, CE 516 can be located in any of a public Cloud Service Providers (CSPs). For example, CE 516 can be implemented in a proprietary cloud-computing platform such as, inter alia, Amazon EC2® and the like. It is noted that resources from Server 508 may arrive via Link A 510 and/or Link B 512. Accordingly, this traffic can continue even if one of the links completely fails. In this way, system 500 can provide resiliency for the network as Link A 510 and/or Link B 512 can be used simultaneously and service can continue even if one of the links falls.

An intelligent edge device (e.g. edge device 506 of FIG. 5) can provide intelligent QoS. For example, applications may respond differently to key network parameters like latency, jitter, bandwidth, packet loss and processing capabilities such as available CPU cycles. For example, a VoIP application may use low bandwidth and may be sensitive to jitter, packet loss. The VoIP application may also consume a large number of CPU cycles despite the low throughput (e.g. because of smaller packet sizes). In contrast, VDI may use high bandwidth and low latency but may not very sensitive to jitter. Accordingly, a network stack can implement a suite of link optimization and remediation technologies to achieve the dual goal of optimal network resource utilization and remediating adverse network events, such as, inter alia: FEC to compensate for packet loss; jitter buffering to counter jitter; and per-packet load balancing to aggregate bandwidth usage and ensure the lowest latency path.

Smart QoS can map application flow into a traffic class and priority queue. A combination of the traffic class and priority queue can then decide the optimal routing, load balancing and remediation to be used for that flow given the prevailing network conditions at that point of time. The network stack can use the following innovations to adapt to dynamic network conditions:

In an intelligent default, the distributed management plane (e.g. an Orchestrator) sets up the edge device with a set of default QoS settings for each application. Each application can then be tagged with an SLA. The SLA can indicate a hint to the edge device for the prioritization and/or sensitivity for that particular application.

In an intelligent pre-emption, a multi-tenant, geo-diverse, network transport agnostic overlay network can be implemented. This can create a situation where the network can pre-empt adverse and/or localized network events by statistical and heuristics based analysis of the network monitoring data that is collected at the Orchestrator. This can remediate certain network conditions that are not addressed by adaptive QoS (e.g. tail drops which result in large number of packets dropped indiscriminately in the core of a service provider network) due to time taken to adapt and the fact that such a loss cannot be really compensated. In a geo-localized region, in the event of constant tail drops for a network service provider, the service can proactively turn on aggressive FEC (e.g. 'always-on FEC') for sensitive applications in both the specific geo-location. In one example, a slightly larger geography for sites that are using the same provider can be used in lieu of the specific geo-location. The 'always-on FEC' can also be configured at the Orchestrator in order to pre-empt network errors and react faster to network errors.

Adaptive QoS can be implemented by monitoring and/or instrumenting network paths. For example, adaptive QoS can be implemented to remediate a network condition that may not conform to the configured SLA for that application. To offset the overheads as a result of the continuous monitoring, the QoE (e.g. user responsiveness) can be periodically or constantly computed to reduce/augment the network monitoring.

Smart QoS can utilize deep learning methods. In addition to responding to dynamic network conditions, the smart QoS can work in tandem with application performance monitoring (APM) to adjust traffic priority based on L7 data. When the DPI engine fails to identify the application, the network stack can utilize statistical parameters (e.g. packet arrival rate, throughput) and heuristics (e.g. User Datagram Protocol (UDP) can be used by real-time applications) to identify the right set of technologies to provide the best performance.

A slow learning with crowdsourcing example is now discussed. Slow learning (e.g. to implement application-aware routing) with crowdsourcing methods can include generating a prepopulated list of well-known applications augmented by mid-flow detected data from a DPI engine. This can enable determination of an application with a first-received packet. Prepopulated data is automatically validated by a DPI engine. Any changes can be fed back locally as well as communicated to the Orchestrator. Some or all data can be shared to other edges/enterprises via the Orchestrator. In one example, L3, L4 network information can be used to create a composite application-routing database. As used herein, L3 network information can include network layer (layer 3) information. As used herein, L4 network information can include transport layer (layer 4) information. The application-routing database (e.g. a local application routing cache, etc.) can be populated by three different types of learning/sources. The first source of information built into the database can include a pre-populated map of DIP/DPORT (Destination Internet Protocol Address/Destination Port Number) to application types (e.g. termed fast learning). A second source of information can include a map of DIP/DPORT to applications that is learned from 'mid-flow' application detection by the DPI engine (e.g. slow learning). The third source of information can also include a map of DIP/DPORT to application names. This can include crowd-sourced (e.g. DIP/DPORT to application name mapping) information that is anonymized and aggregated at the Orchestrator. This mapping can then be shared across different enterprises (e.g. crowd-sourced learning).

Various methods of populating, updating and recovering the application-routing database are now provided. The application-routing database can be pre-populated with the set of known applications that can be identified by the DIP/DPORT and/or packaged as a part of the CPE. Alternatively, it can be downloaded from the Orchestrator. Additionally, an IT Administrator may enter customized DIP/DPORT to application mappings which can be added to the application routing database in the edge device via the Orchestrator. This method can be a component of fast learning.

The application-routing database can also be updated by 'mid-flow' DPI detection data as a result of slow learning methods on the edge device. In addition to this, the fast learning data and slow learning updates from different enterprises can be anonymized and/or aggregated at the Orchestrator. It can be sent down to all the edge device(s) under the management of the Orchestrator. These updates can be part of the crowd-sourced learning methods.

An example application-routing database recovery method is now provided. When an edge device first communicates with the Orchestrator, it can receive the data for pre-population of the application-routing database. This information can include any updates. Updates from slow learning and/or crowd-sourced learning can be synchronized to shared memory areas in the edge device. The updates can be recovered from service outages.

Figure 6:
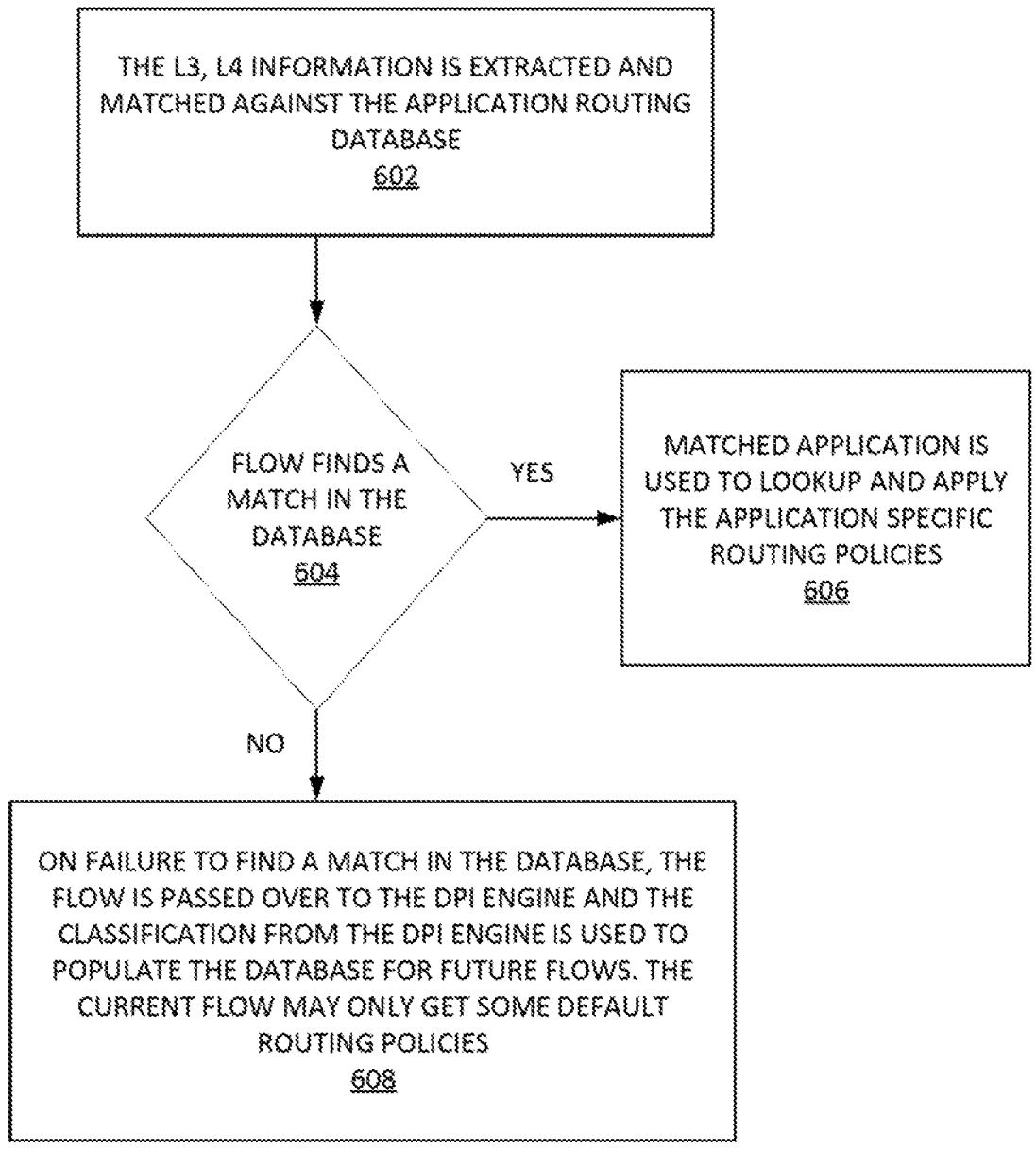
FIG. 6 illustrates an example process of an application-aware routing, according to some embodiments.

FIG. 6 illustrates an example process 600 of an application-aware routing, according to some embodiments. In step 602, the layer 3 (L3) and/or layer 4 (L4) information is extracted and matched against the application routing database (e.g. database in FIG. 6). In step 604, if this flow does not find a match in the database, then process 600 moves to step 608. If 'yes', then process 600 moves to step 606. In step 606, the matched application is used to look-up and apply the application specific routing policies. In step 608, on failure to find a match in the database, the flow is passed over to the DPI engine. The classification from the DPI engine is used to populate the database for future flows. The current flow may obtain some default routing policies as well. In this way, when the same application flow is encountered again, it can find a successful match in database. The application specific routing policy can then be applied for that application flow. A worst-case guarantee of application routing from the second flow can be provided in some examples. It is noted that in the seven-layer OSI model of computer networking, the network layer is L3 and the transport layer is L4.

Figure 7:
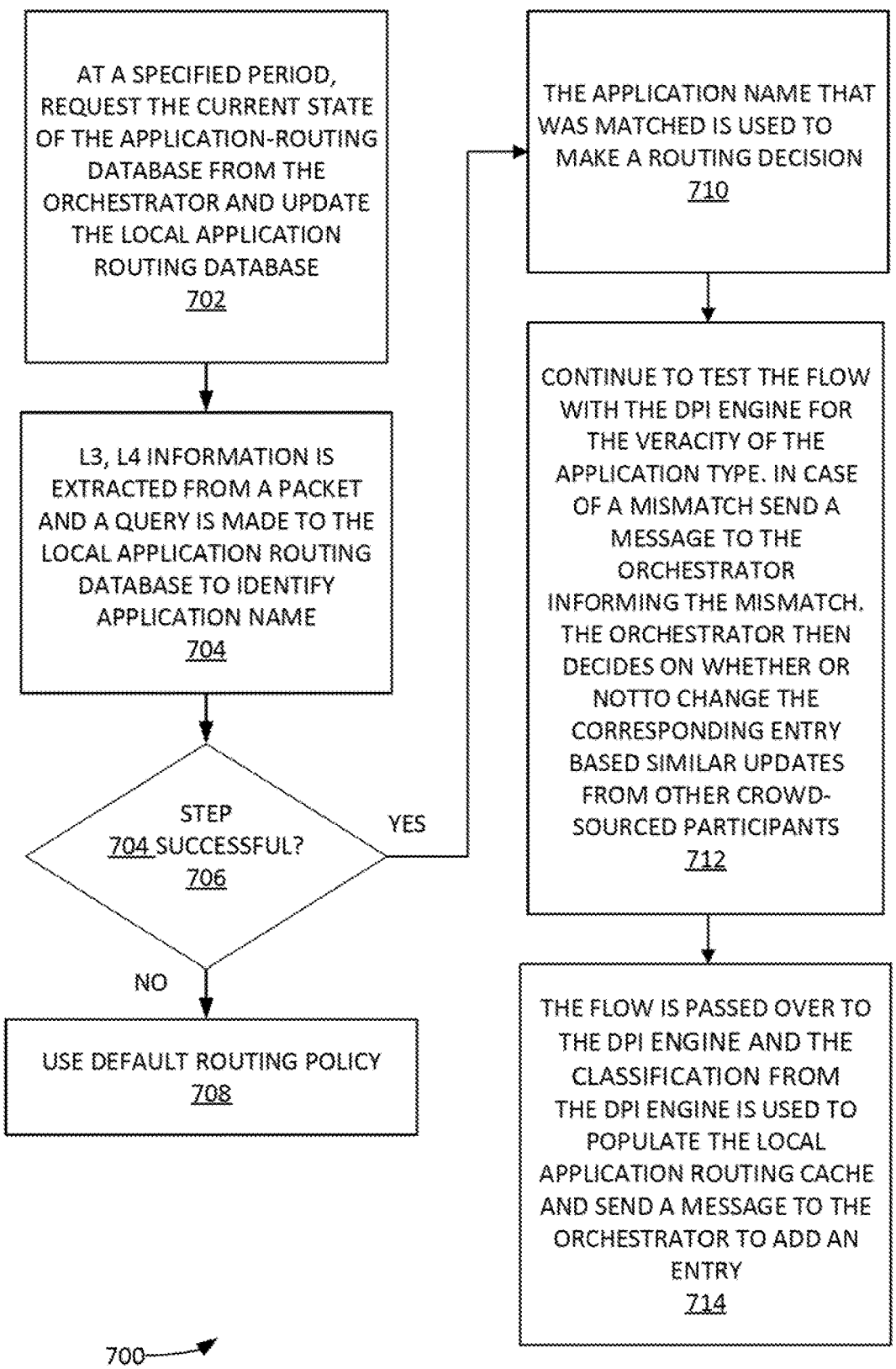
FIG. 7 illustrates another example process of an application-aware routing, according to some embodiments.

FIG. 7 illustrates another example process 700 of an application-aware routing, according to some embodiments. For example, in an alternative step 608, the L3, L4 information can be communicated to an application routing lookup service (e.g. can be a local service synchronized with an aggregated crowd source updated remote service running in the Orchestrator like DNS). In one embodiment, an application-routing database can reside in the Orchestrator. At set intervals (e.g. every thirty (30) seconds, etc.) the edge-device can request the current state of the application-routing database from the Orchestrator and update the local application routing database. Optionally, the cached entries can be expired using a TT (Time-to-Live) value.

In step 702, at a specified period, process 700 can request the current state of the application-routing database from the orchestrator and update the local application routing database. In step 704, L3, L4 information is extracted from a packet and a query is made to the local application routing database to identify application name. In step 706, it can be determined whether step 704 successful? If 'no', then process 700 use a default routing policy in step 708. If 'yes', then the application name that was matched is used to make a routing decision in step 710. In step 712, process 700 can continue to test the flow with the DPI engine for the veracity of the application type. In case of a mismatch send a message to the orchestrator informing the mismatch. the orchestrator then decides whether to change the corresponding entry based similar updates from other crowd-sourced participants. In step 714, the flow is passed over to the dpi engine and the classification from the dpi engine is used to populate the local application routing cache and send a message to the orchestrator to add an entry.

Figure 8:
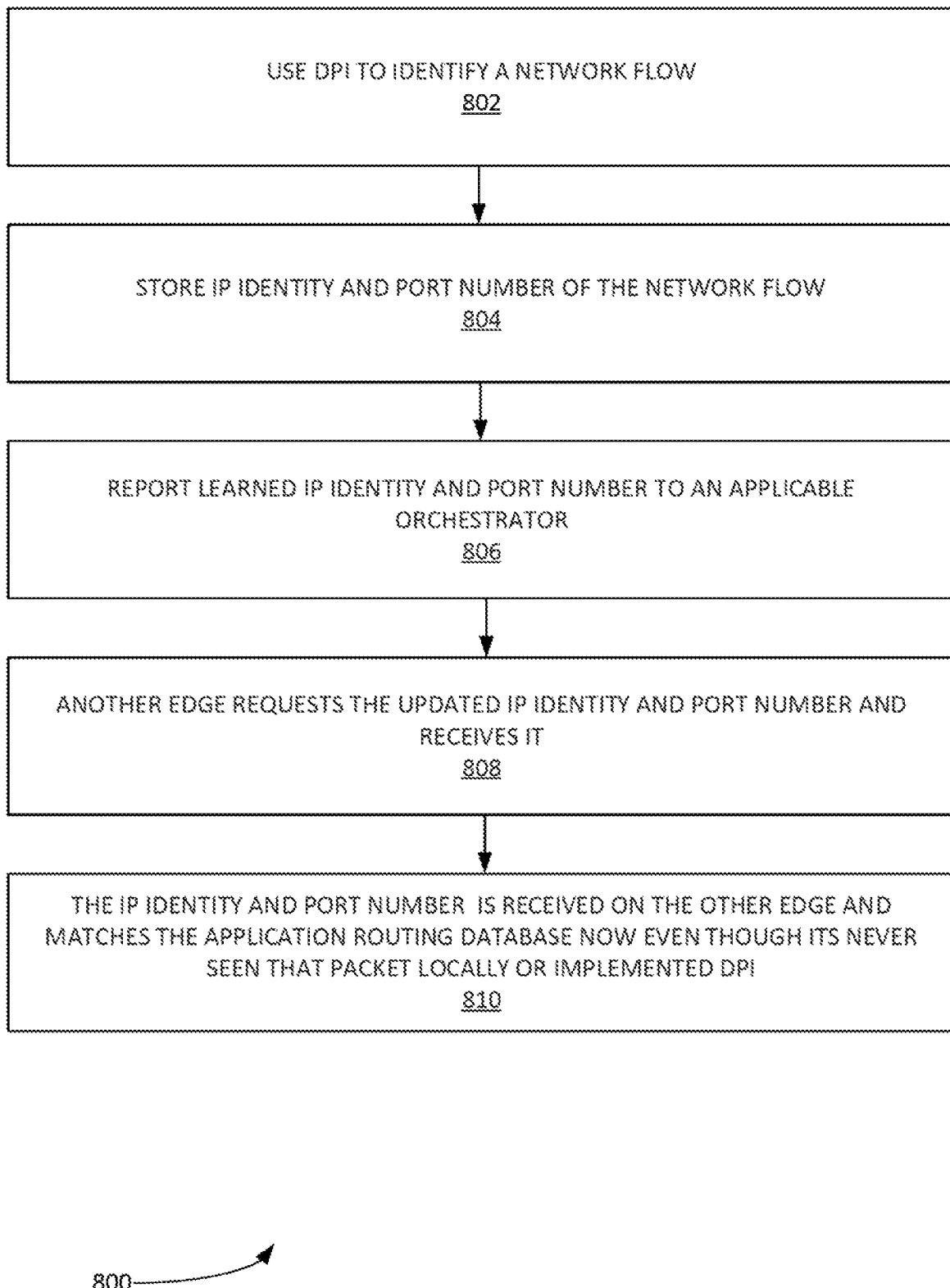
FIG. 8 illustrates application-aware routing with crowdsourcing, according to some embodiments.

FIG. 8 illustrates application-aware routing with crowd-sourcing according to some embodiments. In step 802, process 800 can use DPI to identify a network flow. In step 804, process 800 store internet protocol (IP) identity and port number of the network flow. In step 806, process 800 report learned IP identity and port number to an applicable Orchestrator. In step 808, process 800 another edge requests the updated IP identity and port number and receives it. In step 810, process 800 the IP identity and port number is received on the other edge and matches the application routing database now even though it has never seen that packet locally or implemented DPI.

Additional Exemplary Computer Architecture and Systems

Figure 9:
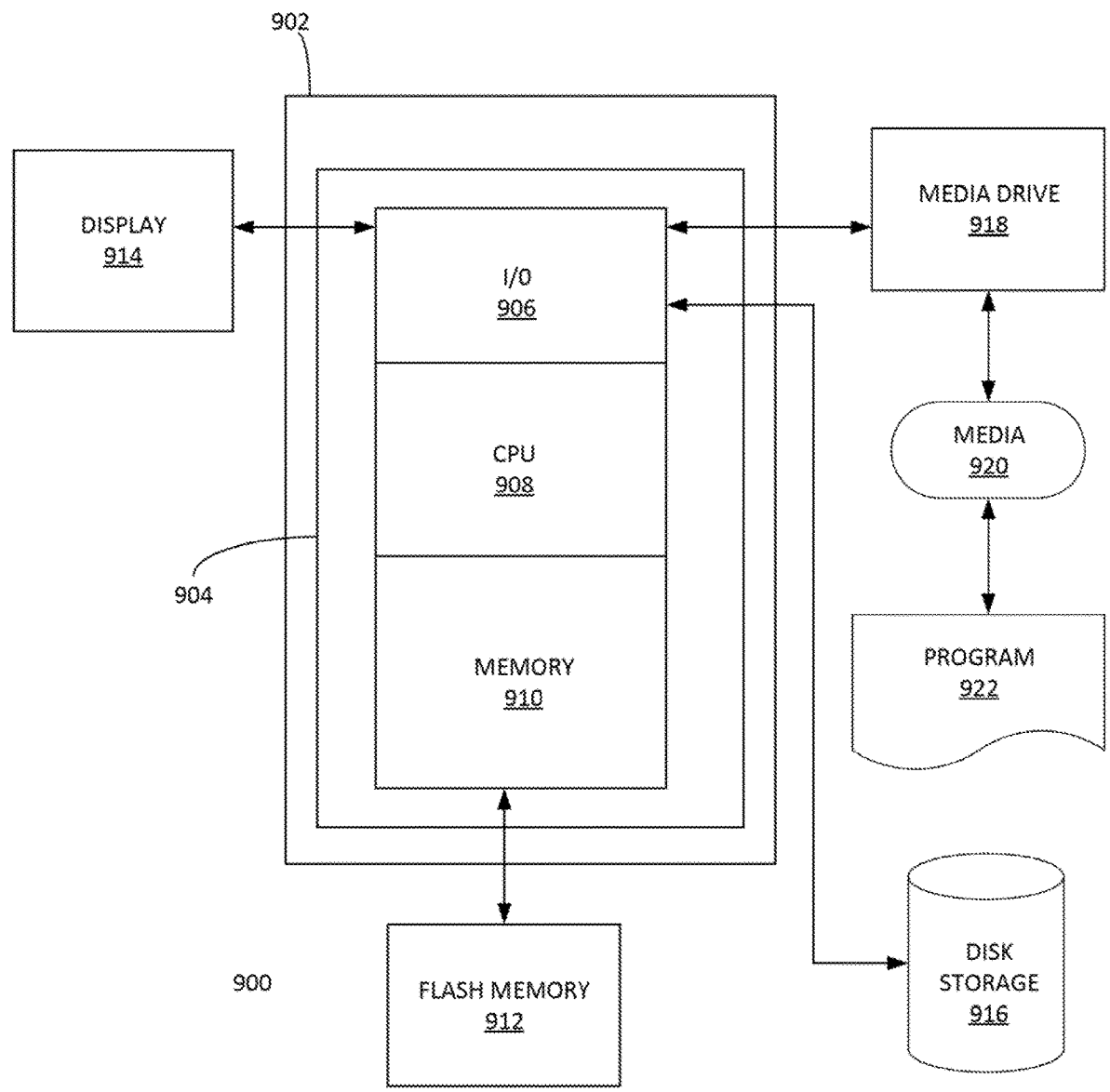
FIG. 9 depicts an exemplary computing system that can be configured to perform any one of the processes provided herein.

FIG. 9 depicts an exemplary computing system 900 that can be configured to perform any one of the processes provided herein. In this context, computing system 900 may include, for example, a processor, memory, storage, and I/O devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts computing system 900 with a number of components that may be used to perform any of the processes described herein. The main system 902 includes a motherboard 904 having an I/O section 906, one or more central processing units (CPU) 908, and a memory section 910, which may have a flash memory card 912 related to it. The I/O section 906 can be connected to a display 914, a keyboard and/or other user input (not shown), a disk storage unit 916, and a media drive unit 918. The media drive unit 918 can read/write a computer-readable medium 920, which can contain programs 922 and/or data. Computing system 900 can include a web browser. Moreover, it is noted that computing system 900 can be configured to include additional systems in order to fulfill various functionalities. Computing system 900 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A method for implementing a virtual private network (VPN) for an enterprise, the method comprising:
    deploying a gateway in at least one public cloud to connect a plurality of premises of an enterprise;
    at each of at least two premises of the enterprise, deploying an edge device that automatically connects to the gateway to establish the VPN for the enterprise;
    from each deployed edge device, providing to the gateway a set of local subnets of the edge device that is reachable over the VPN; and
    from the gateway, distributing to each particular deployed edge device each set of local subnets provided by each other deployed edge device for the particular deployed edge device to use to forward packets to each other deployed edge device.

2. The method of claim 1 further comprising before the VPN is established between the gateway and each deployed edge device, negotiating a secure connection link between the gateway and each deployed edge device in preparation for transmission of secure traffic between the gateway and edge device once the VPN is established.

3. The method of claim 2 further comprising establishing a VPN between the gateway and a particular edge device after the particular edge device receives a message from an orchestrator that the VPN should be established.

4. The method of claim 2 further comprising
    at each edge device, establishing an unsecure tunnel with the gateway before negotiating the secure connection link between the edge device and the gateway,
    said establishing comprising sending, as part of a handshake message exchange, information needed to identify the edge device and a logical identifier for the enterprise.

5. The method of claim 4, wherein as part of the handshake message exchange between the gateway and the edge device, the edge device provides to the gateway the set of local subnets of the edge device.

6. The method of claim 4, wherein the edge device automatically contacts the gateway and provides data as part of the handshake message exchange because each individual gateway is a self-contained autonomous entity that can be configured through the edge devices rather than being configured by an external orchestrator.

7. The method of claim 4 further comprising creating, at the gateway, a new virtual routing and forwarding (VRF) table for the enterprise after being contacted by an initial edge device of the entity.

8. The method of claim 7 further comprising inserting, at the gateway, each edge devices set of reachable local subnets in the VRF table of the edge device's enterprise.

9. The method of claim 1, wherein providing the set of local subnets comprises:
    receiving, at each deployed particular edge device, a message from an orchestrator that the VPN has been enabled;
    after receiving the message, sending the gateway a message to indicate that the set of local subnets of the particular edge device are reachable over the VPN.

10. The method of claim 2, wherein providing the set of local subnets further comprises in preparation for establishing the VPN, providing the set of local subnets before receiving the message from the orchestrator that the VPN has been enabled.

11. The method of claim 1 further comprising implementing a routing protocol between each edge device and the gateway.

12. The method of claim 11, wherein the routing protocol relays state information of each particular edge device that connects to the gateway to each other edge device that connects to the gateway and thus is one hop away.

13. The method of claim 12 further comprising:
    defining a virtual routing and forwarding (VRF) table for the enterprise; and
    identifying in the VRF table each edge device that is one hop away from a particular edge device.

14. The method of claim 12, wherein the state information includes the local subnets reachable over the VPN.

15. A non-transitory machine readable medium storing a program implementing a virtual private network (VPN) for an enterprise, the program for execution by at least one processing unit, the program comprising sets of instructions for:
    configuring a gateway in at least one public cloud to connect a plurality of premises of an enterprise;
    configuring, at each of at least two premises of the enterprise, an edge device that automatically connects to the gateway to establish the VPN for the enterprise;
    configuring each deployed edge device to provide to the gateway a set of local subnets of the edge device that is reachable over the VPN; and
    configuring the gateway to distribute to each particular deployed edge device each set of local subnets provided by each other deployed edge device for the particular deployed edge device to use to forward packets to each other deployed edge device.

16. The non-transitory machine readable medium of claim 15, wherein the program further comprises a set of instructions for configuring each deployed edge device to negotiate a secure connection link with the gateway before the VPN is established between the gateway and the edge device, in order to establish transmission of secure traffic between the gateway and edge device.

17. The non-transitory machine readable medium of claim 16, wherein the program further comprising sets of instructions for
configuring each edge device to establish an unsecure tunnel with the gateway before negotiating the secure connection link between the edge device and the gateway, by sending, as part of a handshake message exchange, information needed to identify the edge device and a logical identifier for the enterprise.

18. The non-transitory machine readable medium of claim 17, wherein as part of the handshake message exchange between the gateway and the edge device, the edge device provides to the gateway the set of local subnets of the edge device.

19. The non-transitory machine readable medium of claim 17, wherein the edge device automatically contacts the gateway and provides data as part of the handshake message exchange because each individual gateway is a self-contained autonomous entity that can be configured through the edge devices rather than being configured by an external orchestrator.

20. The non-transitory machine readable medium of claim 17, wherein the program further comprises a set of instructions for creating, at the gateway, a new virtual routing and forwarding (VRF) table for the enterprise after being contacted by an initial edge device of the entity.

21. The non-transitory machine readable medium of claim 20, wherein the program further comprises a set of instructions for configuring the gateway to insert each edge devices set of reachable local subnets in the VRF table of the edge device's enterprise.

22. The non-transitory machine readable medium of claim 15, wherein each deployed particular edge device receives a message from an orchestrator that the VPN has been enabled, and after receiving the message, sends the gateway a message to indicate that the set of local subnets of the particular edge device are reachable over the VPN.

* * * * *